(12) United States Patent
Sakurai

(10) Patent No.: US 6,407,519 B1
(45) Date of Patent: Jun. 18, 2002

(54) CATHODE-RAY TUBE SYSTEM CAPABLE OF PROVIDING BEAM SPOTS OF A SMALL DIAMETER

(75) Inventor: Hiroshi Sakurai, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/583,252

(22) Filed: May 31, 2000

(30) Foreign Application Priority Data

Jun. 7, 1999 (JP) ............................................ 11-159099

(51) Int. Cl.⁷ .................................................. H01Q 3/22
(52) U.S. Cl. ......................................... 315/371; 348/626
(58) Field of Search ................................. 315/371, 370; 348/615, 806, 807, 626

(56) References Cited

U.S. PATENT DOCUMENTS

| | | | |
|---|---|---|---|
| 4,916,365 A | * 4/1990 | Arai | 315/383 |
| 5,475,286 A | * 12/1995 | Jackson et al. | 315/371 |
| 5,652,482 A | * 7/1997 | Tripod | 315/370 |
| 5,663,615 A | * 9/1997 | Ogino | 315/371 |
| 5,717,296 A | * 2/1998 | Onozawa et al. | 315/371 |

FOREIGN PATENT DOCUMENTS

| | | |
|---|---|---|
| JP | 2185191 | 7/1990 |
| JP | 4036947 | 2/1992 |
| JP | 7327145 | 12/1995 |

* cited by examiner

*Primary Examiner*—Don Wong
*Assistant Examiner*—Thuy Vinh Tran
(74) *Attorney, Agent, or Firm*—Price & Gess

(57) ABSTRACT

A signal is sent to a deflection circuit and a video signal processing circuit. On receiving the signal, the deflection circuit outputs a vertical deflection signal and a horizontal deflection signal. The vertical deflection signal is sent directly to a deflection yoke while the horizontal deflection signal is sent via an S-shaped wave modulation circuit to the deflection yoke. On the other hand, the video signal processing circuit receives the signal and outputs a video signal via an amplitude modulation circuit and a frequency modulation circuit to a cathode of an electron gun. The S-shaped wave modulation circuit performs modulation on the horizontal deflection signal to change scanning speed. The amplitude modulation circuit and the frequency modulation circuit perform, on the video signal, amplitude modulation and frequency modulation which are appropriate for this speed.

22 Claims, 17 Drawing Sheets

FIG. 14

COEFFICIENT
MEMORY UNIT

| ADDRESS | COEFFICIENT |
|---------|-------------|
| 0000000 | 10000000 |
| 0000001 | 10000001 |
| 0000010 | 10000010 |
| ⋮ | ⋮ |
| 0111111 | 11111111 |
|  | 11111110 |
|  | 11111101 |
|  | ⋮ |
| 1111111 | 10000000 |

| ADDRESS | DATA |
|---|---|
| 0000000 | 000000 |
| 0000001 | 000001 |
| 0000010 | 000010 |
| ⋮ | ⋮ |
| 1000000 | 111111 |
|  | 111110 |
|  | 111101 |
| ⋮ | ⋮ |
| 1111111 | 000000 |

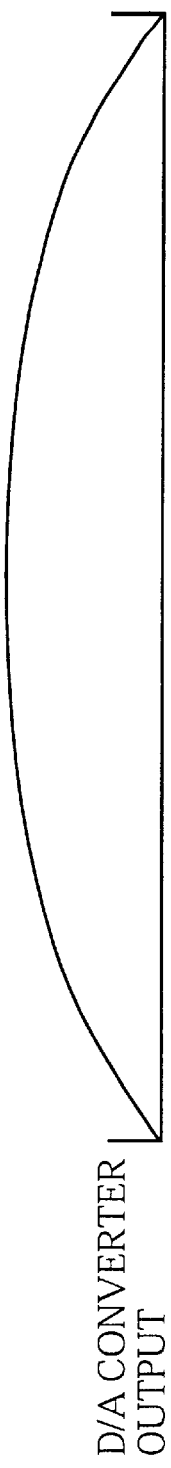
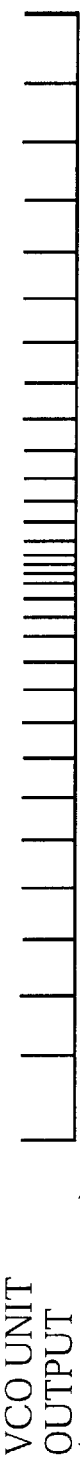
FIG. 19A  Hsync
FIG. 19B  SYNC CLOCK
FIG. 19C  D/A CONVERTER OUTPUT
FIG. 19D  VCO UNIT OUTPUT (READ CLOCK)

S-SHAPED WAVE
MODULATION ON
VERTICAL
DEFLECTION
SIGNAL

FREQUENCY
MODULATION
ON HORIZONTAL
DEFLECTION SIGNAL

CATHODE-RAY TUBE SYSTEM CAPABLE OF PROVIDING BEAM SPOTS OF A SMALL DIAMETER

This application is based on application No. 11-159099 filed in Japan, the content of which is hereby incorporated by reference.

BACKGROUND OF THE INVENTION (1) Field of the Invention

The present invention relates to a cathode-ray tube (CRT) system, which is a representative example of a display device.

(2) Description of the Prior Art

One fundamental requirement for a display device, such as a computer monitor, is to display small characters clearly in every part of the screen.

A CRT device used as a display device emits and deflects an electron beam so as to scan the entire viewing area. As the deflected beam travels further to reach positions away from the center of the screen, a spot formed by focusing the beam is likely to be distorted near the edges of the screen, so that the shape and size of spots differ at different positions in the screen. This usually results in differences in resolution between the center and outer areas of the screen, with the outer areas generally having a lower resolution.

Japanese Laid-Open Patent Application No. 7-327145 discloses a technique to provide uniform resolution across the viewing area of a CRT device. With this technology, a CRT device is provided with a deflection waveform generating circuit that raises the speed of the horizontal scanning at positions near the center of the screen and lowers it at positions near the edges of the screen. Video data is read according to a horizontal deflection signal generated by this deflection waveform generating circuit.

This technique increases the diameter of the beam spot near the center of the screen and reduces the diameter near the edges of the screen to counteract the stated phenomenon. This makes the spot diameter almost uniform across the screen, which also makes the resolution almost uniform across the screen.

In this way, the stated technique can change a diameter of a beam spot (hereafter a scanning spot) perceived by the viewer per unit time during the scanning. However, this technology cannot reduce a diameter of a "static" spot formed by the electron beam. Accordingly, when resolution should be enhanced further, manufacturers have to use other techniques to reduce the diameter of the static spot, such as by improving the performance of the electron gun.

SUMMARY OF THE INVENTION

In view of the above problems, the first object of the present invention is to provide a CRT system that can display images of a uniform and high resolution in every area of the screen without a complex construction being included in the CRT system.

The second object of the present invention is to reduce the diameter of a static spot without giving a special construction to an electron gun.

The third object of the invention is to provide a technique that reduces large diameters of scanning spots to a diameter of a small spot and makes every scanning spot diameter small and substantially the same.

The above objects can be achieved by a CRT system of a raster scan type that displays images on a screen by deflecting an electron beam, which has been modulated using a video signal, to consecutively scan the screen in a main scanning direction while scanning in a sub-scanning direction that is perpendicular to the main scanning direction, the CRT system including: a speed modulating unit for modifying a deflection speed by modulating a deflection signal that is used to deflect the electron beam in either the sub-scanning direction or the main scanning direction, the deflection speed being a speed at which the electron beam traverses the screen in either the sub-scanning direction or the main scanning direction; an amplitude modulating unit for performing amplitude modulation on the video signal; and a frequency modulating unit for performing frequency modulation on the deflection signal and/or the video signal either before or after the amplitude modulation.

For this construction, resolution becomes almost uniform across the screen. In addition, the diameter of a static spot can be reduced.

Here, the sub-scanning direction may be a vertical direction of the screen and the main scanning direction may be a horizontal direction of the screen. The speed modulating unit may modify the deflection speed to high at positions near a center of the screen and low at positions near edges of the screen, the deflection speed being a horizontal deflection speed at which the electron beam traverses the screen in the horizontal direction. The amplitude modulating unit and the frequency modulating unit may perform the amplitude modulation and the frequency modulation, respectively, on the video signal in synchronization with a horizontal scan cycle during which the electron beam makes one complete traverse of the screen in the horizontal direction.

With this construction, brightness increases near the right and left edges of the screen. This increase in brightness contributes to raising resolution near the edges of the screen.

Here, the amplitude modulating unit may perform the amplitude modulation on the video signal to raise an amplitude of the video signal-at the positions where the horizontal deflection speed is made high, and to lower the amplitude of the video signal at the positions where the horizontal deflection speed is made low. The frequency modulating unit may perform the frequency modulation on the video signal to raise a frequency of the video signal at the positions where the horizontal deflection speed is made high, and to lower the frequency of the video signal at the positions where the horizontal deflection speed is made low.

For this construction, resolution near the right and left edges of the screen can be enhanced without changing brightness of original images and distorting the images.

Here, the deflection signal may be a horizontal deflection signal, and the speed modulating unit may be a circuit that performs S-shaping modulation on the horizontal deflection signal to shape a wave of the horizontal deflection signal into an S-shape. The S-shaping modulation may change the horizontal deflection speed to a higher extent than is required to counteract differences in the horizontal deflection speed that are present at different positions of the screen, the differences resulting from differences in deflection sensitivity between: (a) right and left edges of the screen; and (b) a center part of the screen.

With this construction, it is possible to perform scanning on two scanning lines during each deflection cycle.

Here, a horizontal scan may be performed in a reciprocating manner in which scanning directions on adjacent horizontal scanning lines are opposite.

Here, the sub-scanning direction may be a vertical direction of the screen, and the main scanning direction may be a horizontal direction of the screen. The speed modulating unit may modify the deflection speed to high at positions near a center of the screen and low at positions near edges of the screen, the deflection speed being a vertical deflection speed at which the electron beam traverses the screen in the vertical direction. The amplitude modulating unit may perform the amplitude modulation on the video signal in synchronization with a vertical scan cycle in which the electron beam makes one complete traverse of the screen in the vertical direction. The frequency modulating unit may perform the frequency modulation on the video signal and a deflection signal that is a horizontal deflection signal in synchronization with the vertical scan cycle.

Here, the amplitude modulating unit may perform the amplitude modulation on the video signal to raise an amplitude of the video signal at the positions where the vertical deflection speed is made high, and to lower the amplitude of the video signal at the positions where the vertical deflection speed is made low. The frequency modulating unit may perform the frequency modulation on the video signal and the horizontal deflection signal to raise frequencies of the horizontal deflection signal and the video signal at the positions-where the vertical deflection speed is made high, and to lower the frequencies of the video signal and the horizontal deflection signal at the positions where the vertical deflection speed is made low.

The above objects can be also achieved by a CRT system of a raster scan type that displays images on a screen by deflecting an electron beam, which has been modulated using a video signal, to consecutively scan the screen in a main scanning direction while scanning in a sub-scanning direction that is perpendicular to the main scanning direction, the CRT system including: a first speed modulating unit for modifying a first deflection speed by modulating a first deflection signal in first cycles equal to a period during which the electron beam makes one complete traverse of the screen in the sub-scanning direction, the first deflection signal being used to deflect the electron beam in the sub-scanning direction, the first deflection speed being a speed at which the electron beam traverses the screen in the sub-scanning direction; a first amplitude modulating unit for performing first amplitude modulation on the video signal in the first cycles; a first frequency modulating unit for performing, in synchronization with the first amplitude modulation, first frequency modulation on: (a) the video signal; and (b) a second deflection signal that is used to deflect the electron beam in the main scanning direction, the first frequency modulation being performed either before or after the first amplitude modulation; a second speed modulating unit for modifying a second deflection speed by modulating the second deflection signal in second cycles equal to a period during which the electron beam makes one complete traverse of the screen in the main scanning direction, the second deflection speed being a speed at which the electron beam traverses the screen in the main scanning direction; and a second amplitude modulating unit for performing second amplitude modulation on the video signal in the second cycles; and a second frequency modulating unit for performing, in synchronization with the second amplitude modulation, the second frequency modulation on the video signal, the second frequency modulation being performed either before or after the second amplitude modulation.

Here, the sub-scanning direction may be a vertical direction of the screen and the main scanning direction may be a horizontal direction of the screen. The first speed modulating unit may modify the first deflection speed to high at positions near a center of the screen and low at positions near edges of the screen, the first deflection speed being a vertical deflection speed at which the electron beam traverses the screen in the vertical direction. The first amplitude modulating unit may perform the first amplitude modulation to raise an amplitude of the video signal at the positions where the vertical deflection speed is made high, and to lower the amplitude of the video signal at the positions where the vertical deflection speed is made low. The first frequency modulating unit may perform the first frequency modulation to raise frequencies of the second deflection signal and the video signal at the positions where the vertical deflection speed is made high, and to lower the frequencies of the second deflection signal and the video signal at the positions where the vertical deflection speed is made low. The second speed modulating unit may modify the second deflection speed to high at positions near a center of the screen and low at positions near edges of the screen, the second deflection speed being a horizontal deflection speed at which the electron beam traverses the screen in the horizontal direction. The second amplitude modulating unit may perform the second amplitude modulation to raise an amplitude of the video signal at the positions where the horizontal deflection speed is made high, and to lower the amplitude of the video signal at the positions where the horizontal deflection speed is made low. The second frequency modulating unit may perform the second frequency modulation to raise a frequency of the video signal at the positions where the horizontal deflection speed is made high, and to lower the frequency of the video signal at the positions where the horizontal deflection speed is made low.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 14 shows a construction of a coefficient memory unit shown in FIG. 13;

FIGS. 19A–19D show waveforms of signals outputted by circuits and units shown in FIG. 16;

DESCRIPTION OF THE PREFERRED EMBODIMENTS

The following describes embodiments of the present invention.

First Embodiment

Figure 1:
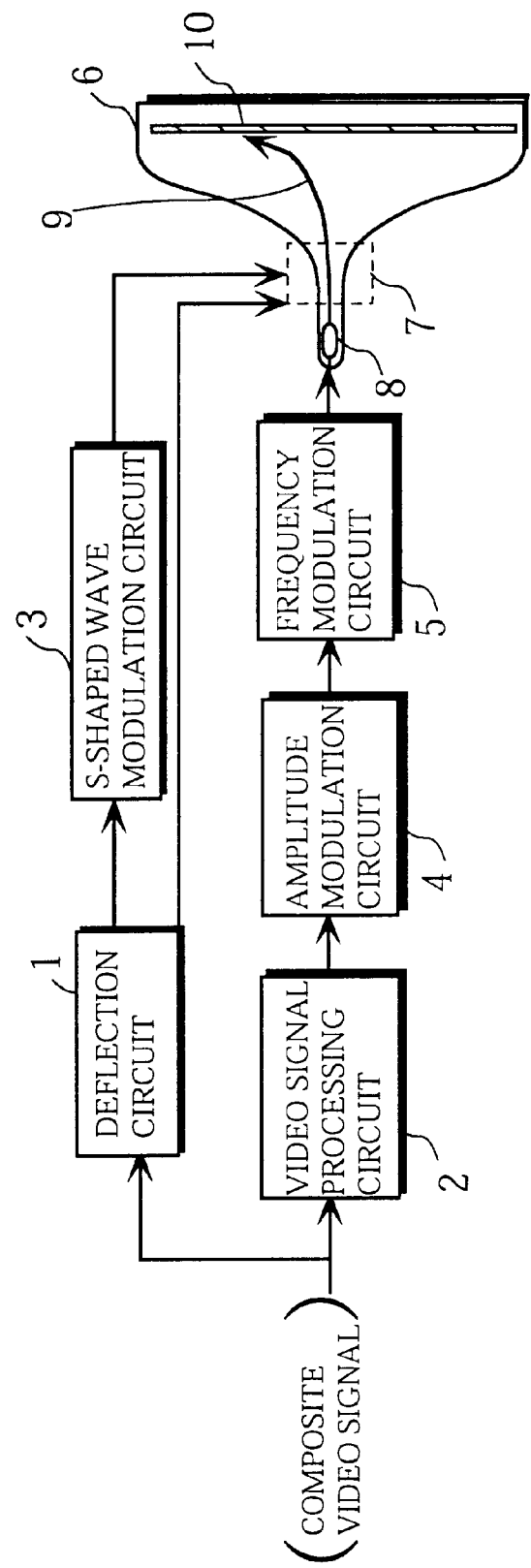
FIG. 1 shows a construction of a CRT system according to the first embodiment of the present invention.

FIG. 1 is a diagram showing the construction of a CRT system according to the first embodiment of the present invention.

The present CRT system comprises the following elements: a deflection circuit 1; a video signal processing circuit 2; an S-shaped wave modulation circuit 3; an amplitude modulation circuit 4; a frequency modulation circuit 5; and a CRT 6. With this CRT system, a composite video signal is sent to the deflection circuit 1 and the video signal processing circuit 2, passed to the other circuits, and outputted to the CRT 6 as images.

A composite video signal contains a horizontal synchronous (hereafter Hsync) signal, a vertical synchronous (Vsync) signal, a video signal, and an audio signal, and is inputted to the CRT system by a tuner circuit in a receiver or from an external video input terminal. For the present embodiment, the composite video signal is described as being digital although it may be analog instead. On receiving a composite signal, the deflection circuit 1 extracts an Hsync signal and a Vsync signal, and generates an analog horizontal deflection signal and an analog vertical deflection signal from the extracted Hsync and Vsync signals. The generated vertical deflection signal is outputted directly to a deflection yoke 7 attached to the CRT 6, while the horizontal deflection signal is sent via the S-shaped wave modulation circuit 3 to the deflection yoke 7. A composite video signal that has been inputted to the video signal processing circuit 2 is sent via the amplitude modulation circuit 4 and the frequency modulation circuit 5 to a cathode (not shown in the figure) of the electron gun 8 in the CRT 6. The electron gun 8 emits an electron beam 9, which is then deflected vertically and/or horizontally by a magnetic field generated by the deflection yoke 7. This electron beam 9 produces images on a screen 10 coated with phosphors.

Figure 2:
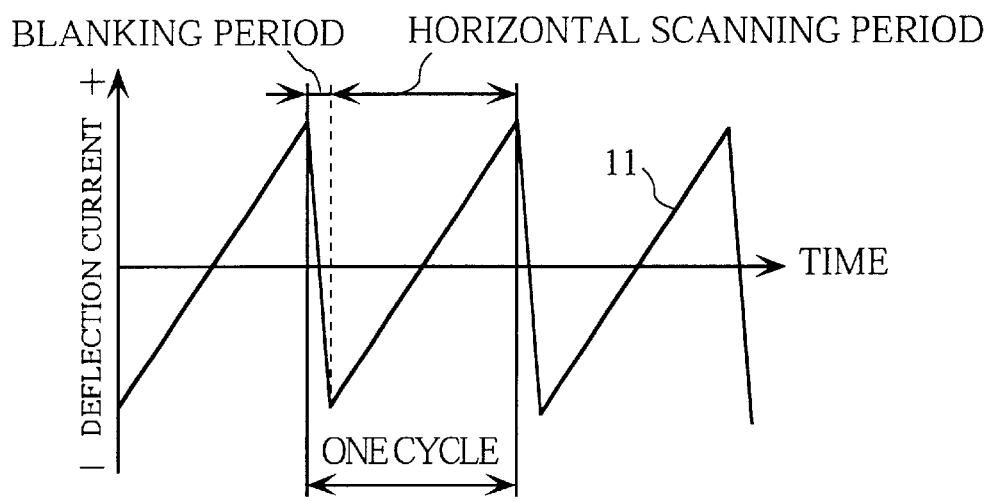
FIG. 2 shows a waveform of a horizontal deflection signal, which is generated by a CRT circuit before performing S-shaped wave modulation on the deflection signal.

The deflection circuit 1 and the video signal processing circuit 2 are conventional circuits, which are usually built into a CRT system. The deflection circuit1 generates a deflection signal for the deflection yoke 7. The horizontal deflection signal has a sawtooth waveform 11 as shown in FIG. 2. Note that a blanking period in the figure should be shown as, to be exact, a flyback period and that the blanking period is usually set longer than this flyback period and includes the flyback period, although the figure shows these two periods as the same period for ease of explanation to be provided corresponding to FIG. 3. The video signal processing circuit 2 receives a composite video signal, extracts a video signal from the received composite video signal, and performs the necessary operations on the extracted video signal such as gray scale correction. As a result, a 12-bit digital video signal, for instance, is outputted.

Figure 3:
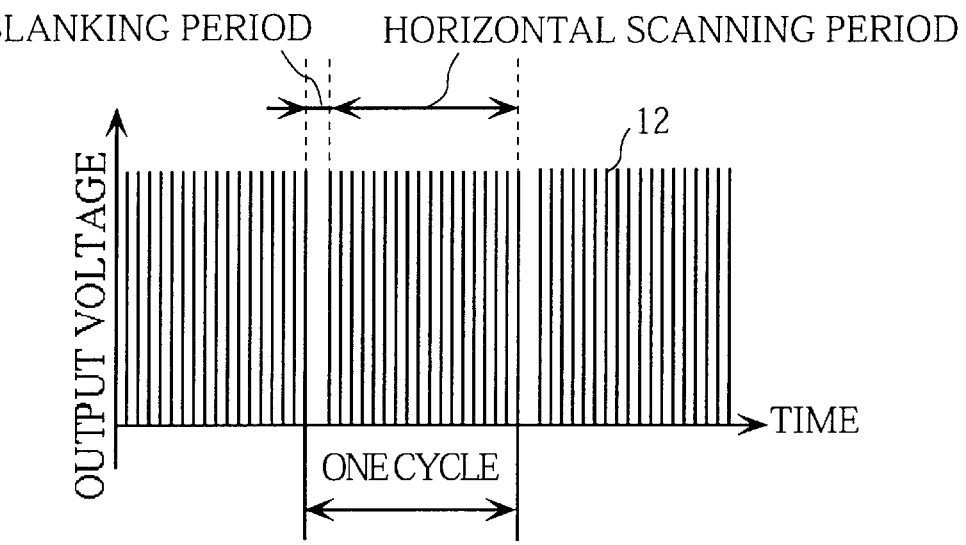
FIG. 3 shows a waveform of a video signal, which is demodulated by the CRT circuit before performing the S-shaped wave modulation.
Figure 4:
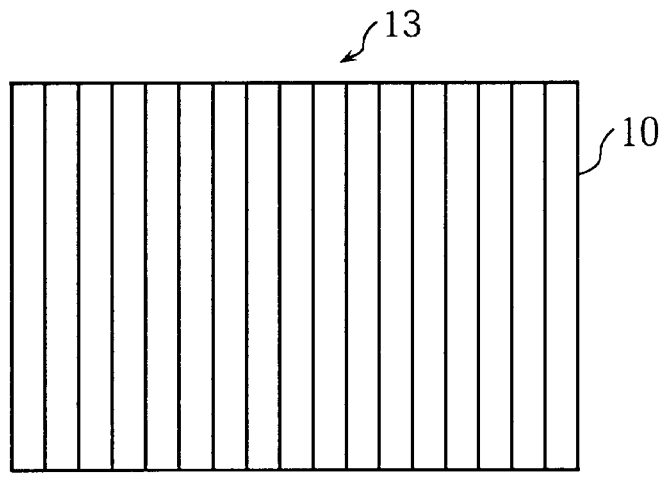
FIG. 4 shows images which are displayed by the CRT system before the S-shaped wave modulation is performed.

For instance, the video signal processing circuit 2 outputs a plurality of pulses as a video signal, which are shown in FIG. 3, in order to try to have a uniform vertical stripe pattern 13 in FIG. 4 displayed. As shown in FIG. 3, the video signal processing circuit 2 repeatedly outputs a pulse 12 of a fixed voltage at regular intervals during each horizontal scan. In this figure, a period during which no video signals are outputted is shown as a blanking period, and a period during which video signals are outputted (i.e., a period during which images are displayed) is shown as a horizontal scanning period. However, a horizontal scanning period is usually set a little longer than such an image display period, to be exact. In this figure, these two periods are shown as the same one period for ease of explanation provided corresponding to FIG. 2. Also, note that FIGS. 2 and 3 are provided for describing horizontal scanning, and one scanning line on the screen 10 corresponds to one cycle shown in these figures. Furthermore, note that FIG. 3 shows a digital video signal as an analog video signal for ease of understanding.

The video signal processing circuit 2 outputs a video signal to the amplitude modulation circuit 4 and the frequency modulation circuit 5, where the video signal is amplitude- and frequency- modulated. This modulated video signal is then deflected horizontally according to a horizontal deflection signal on which S-shaped wave modulation has been performed, and displayed on the screen 10. The following describes the S-shaped wave modulation circuit 3, the amplitude modulation circuit 4, and the frequency modulation circuit 5 separately for ease of explanation.

Figure 5:
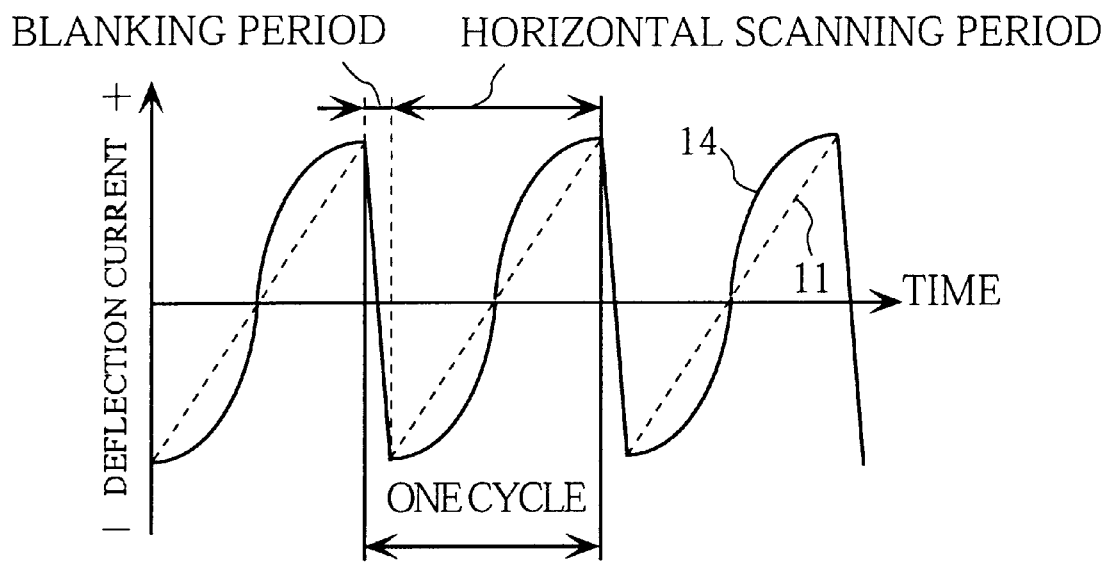
FIG. 5 shows a waveform of a horizontal deflection signal on which the CRT circuit has performed the S-shaped wave modulation.

The S-shaped wave modulation circuit 3 is a conventional circuit that shapes the waveform of the horizontal deflection signal into an S-shape. On receiving a horizontal deflection signal with a sawtooth waveform 11 shown by the dotted lines in FIG. 5 from the deflection circuit 1, the S-shaped wave modulation circuit 3 shapes it into the S-shaped wave 14 shown by the solid line in the figure. This is to say, the S-shaped wave modulation circuit 3 makes the change in deflection current per unit time smaller at positions near the edges of the screen 10 than at positions near the center of the screen 10.

Figure 6:
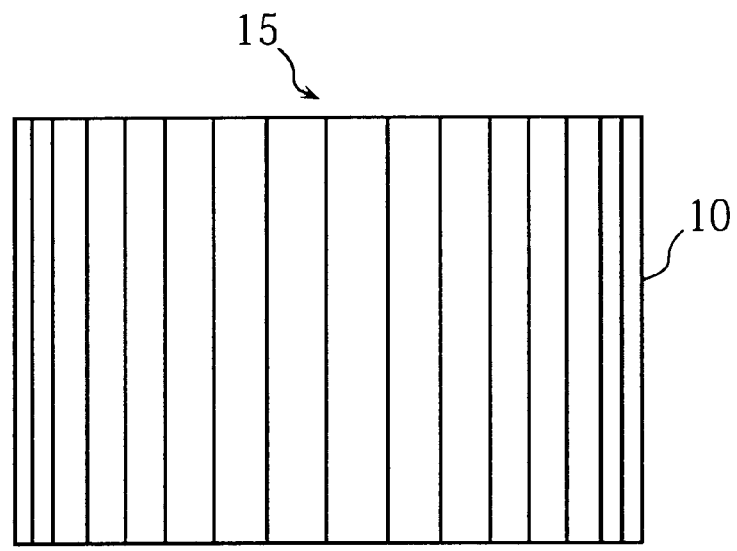
FIG. 6 shows images, which the CRT system displays after the S-shaped wave modulation have been performed.

When such an S-shaped horizontal deflection signal is sent to the deflection yoke 7, the horizontal scanning speed becomes faster at positions nearer the center of the screen 10 and slower at positions nearer the right and left edges of the screen 10. This results in the CRT system displaying, instead of the uniform stripe pattern 13, a nonuniform stripe pattern 15, in which stripes are displayed more densely nearer the right and left edges of the screen 10 and less densely nearer the center of the screen 10. With conventional CRT systems, a scanned distance per unit time usually becomes longer near the right and left edges of the screen than at the center of the screen in accordance with changes in a deflection angle. This is to say, deflection sensitivity becomes higher near the edges of the screen than at the center. To display stripes spaced regularly, some conventional CRT systems perform very moderate S-shaped wave modulation as a standard operation. The CRT system of the present embodiment, however, performs an exaggerated S-shaped wave modulation to deliberately narrow the intervals between the stripes near the right and left edges of the screen. Note that FIG. 6 shows the nonuniform stripe pattern 15 that is displayed under the condition in which the processing of the amplitude modulation circuit 4 and the frequency modulation circuit 5 is stopped, for ease of explanation.

Figure 7:
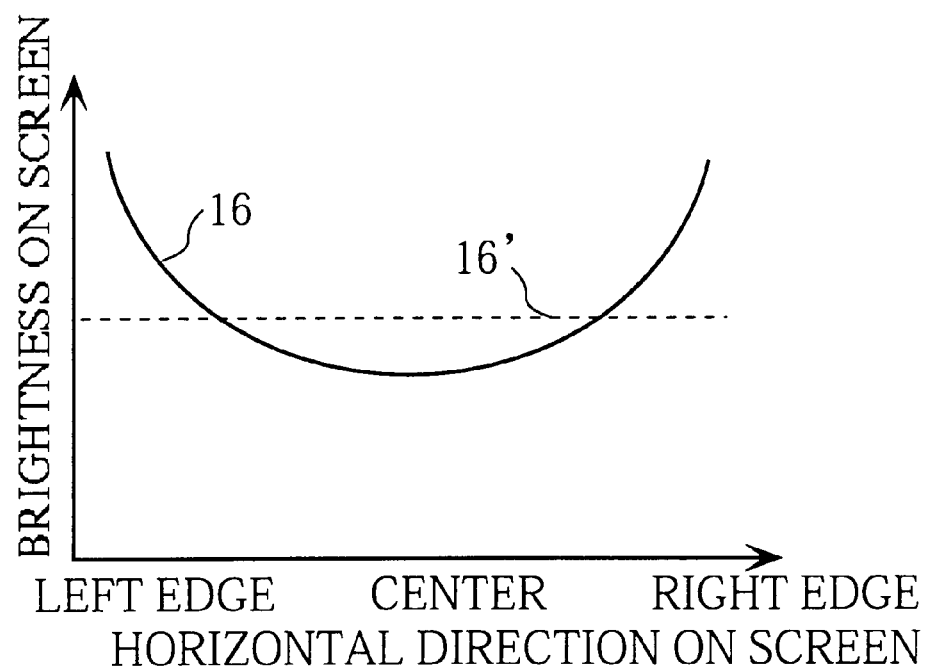
FIG. 7 shows change in brightness distribution on a screen of the CRT system.

When the above S-shaped wave modulation is performed on a horizontal deflection signal, brightness distribution on the screen 10 also changes. The following describes brightness distribution, using a simple case in which the present CRT system displays images of single tone such as when the entire screen is white, for ease of explanation. When no S-shaped wave modulation is performed on a horizontal deflection signal, brightness distribution is as shown by dotted lines 16' while if the S-shaped wave modulation is performed, brightness distribution changes as shown by a curve 16, so that brightness is lower near the center of the screen 10 and higher near the right and left edges. Such differences in brightness between the center and edges of the screen 10 are caused by a direct proportional relationship between brightness and duration of irradiation with an electron beam. This is to say, modulation by the S-shaped wave modulation circuit 3 results in making the duration for which a phosphor dot (or a stripe) is irradiated shorter nearer the center of the screen 10 and longer nearer the right and left edges. As a result, brightness changes, as shown in FIG. 7, proportionate to the irradiation duration of each point on the screen 10.

The following describes the processing of the amplitude modulation circuit 4. For ease of explanation, the following explanation assumes that the S-shaped wave modulation circuit 3 operates but the frequency modulation circuit 5 does not operate. The construction of the amplitude modulation circuit 4 will be described later.

Figure 8:
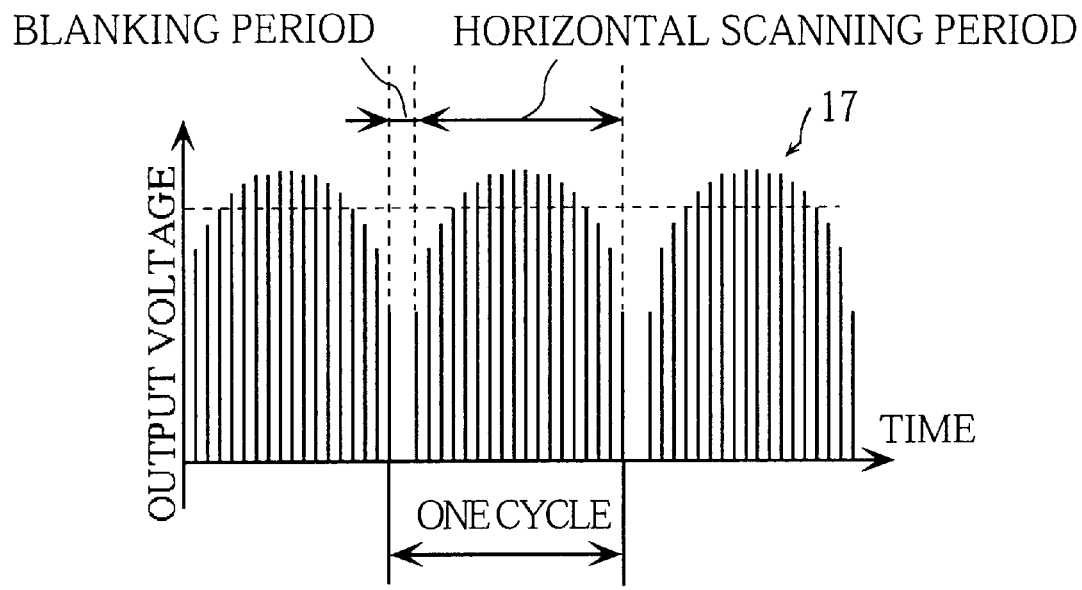
FIG. 8 shows a waveform of a video signal which the CRT circuit outputs after having performed amplitude modulation on the video signal.

In synchronization with the horizontal deflection signal, the amplitude modulation circuit 4 performs amplitude modulation on a video signal to counteract the aforementioned differences in brightness between the center and edges of the screen 10. Accordingly, the amplitude modulation circuit 4 outputs, in each cycle, an amplitude-modulated signal 17 with an inverted-U-shaped waveform as shown in FIG. 8. More specifically, the amplitude modulation circuit 4 performs amplitude modulation on a video signal by increasing its amplitude when the video signal is to be applied to positions where the scanning speed increases as a result of the S-shaped wave modulation, and by decreasing amplitude for positions where the scanning speed is lowered. Here, a video signal modulated by the amplitude modulation circuit 4 is assumed to be for images of a single tone, for ease of explanation, although in reality, amplitude modulation has been performed on this video signal in accordance with the gray scales of images corresponding to the video signal in advance. Accordingly, the amplitude modulation circuit 4 performs amplitude modulation in synchronization with a horizontal deflection signal on a video signal, on which amplitude modulation in accordance with gray scales for the video signal has been already performed.

When an amplitude-modulated video signal has been outputted from the amplitude modulation circuit 4 to the cathode of the electron gun 8, the electron gun 8 emits an electron beam that is modulated as a beam of a higher current at positions nearer the center of the screen 10 and of a lower current at positions nearer the right and left edges of the screen 10. As a result, when images of a single tone, such as white, are displayed on the screen 10, the beam current distribution on the screen 10 becomes as shown by a curve 18 in FIG. 9, where the beam current is higher at positions nearer the center of the screen 10 and lower at positions nearer the left and right edges of the screen 10.

Figure 10:
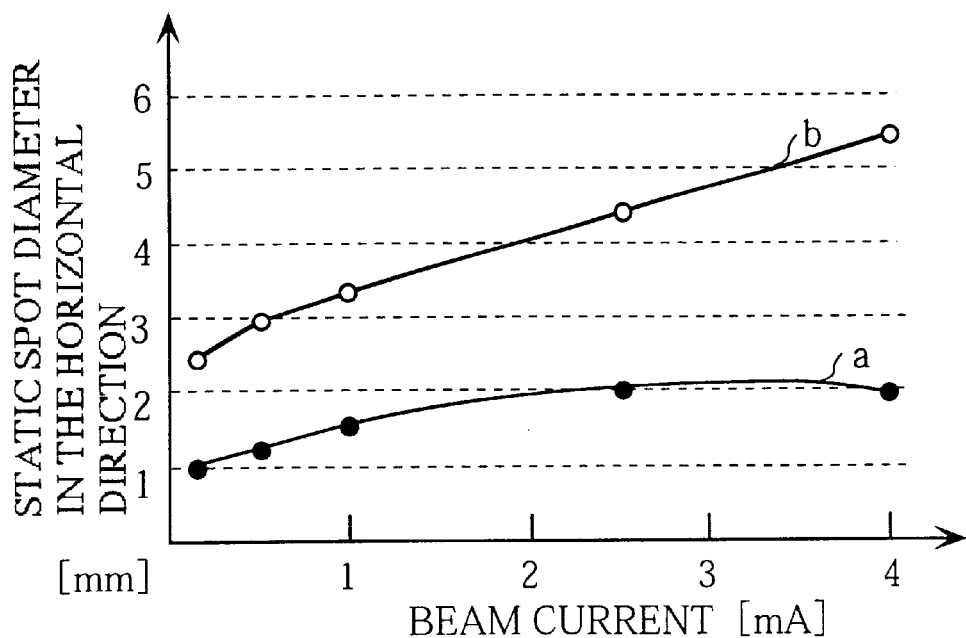
FIG. 10 shows example changes in diameters of static spots in accordance with each beam current, which are displayed on the edges and center of the screen.

The following describes the relationship between beam current and resolution. FIG. 10 shows how the diameter of a displayed static spot changes in accordance with changes in the beam current, which is emitted by a CRT system having a diagonal screen size of, for instance, 76 cm. In the figure, a line a is for the center of the screen, and a line b is for a position near right and left edges of the screen. As can be seen by comparing the static spot displayed in the center with the static spot at the right and left edges of the screen, the static spot diameter is at least twice as large at the edges of the screen than at the center for every beam current. Also, the line b has a steeper gradient than the line a, which is to say, the rate of increase in static spot diameter that accompanies changes in beam current is higher at the edges of the screen than at the center. This means that positions near the right and left edges of the screen have a lower resolution and higher dependency on beam current than positions near the center when the same beam current is given. This is to say, when the beam current increases, the static spot diameter in the center of the screen remains almost the same although the spot diameter near the edges of the screen greatly increases since the spot displayed near the edges has higher dependency on beam current.

Figure 9:
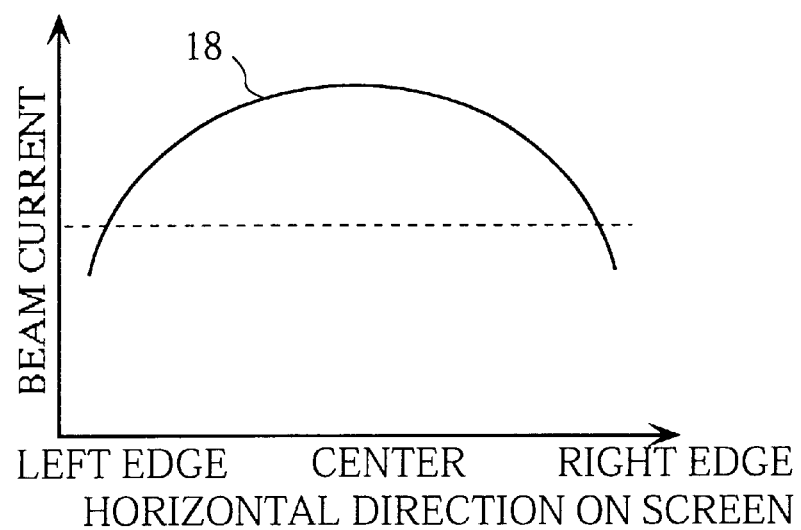
FIG. 9 shows a beam current distribution which can be obtained after the CRT circuit has performed the amplitude modulation.

Accordingly, it is possible to enhance resolution at positions near the edges of the screen without affecting resolution at positions near the center by providing a lower beam current for positions nearer the edges of the screen as shown in the beam current distribution in FIG. 9.

Brightness can be considered to be in a direct proportional relationship with a beam current. Therefore, when the beam current distribution is as shown in FIG. 9, a brightness distribution represented by a curve 16 in FIG. 7 changes to a distribution represented by dotted lines 16', which show the uniform brightness for both the center and the edges of the screen. In this way, differences in brightness and resolution between the center and edges of the screen 10 are counteracted by performing amplitude modulation on a video signal. However, the image distortion as shown in FIG. 6 still remains because the beam scanning is performed according to the S-shaped modulated deflection signal shown in FIG. 5. The following describes the frequency modulation circuit 5 which corrects this distortion.

Figure 11:
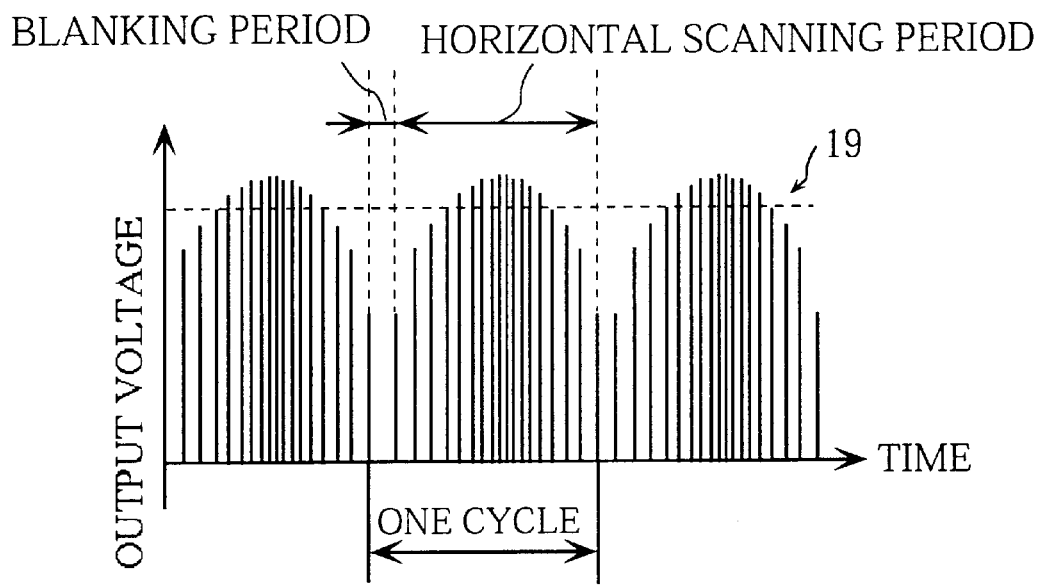
FIG. 11 shows video signals, which are outputted by the CRT circuit after having performed amplitude modulation and frequency modulation on these video signals.

The frequency modulation circuit 5 receives a video signal (i.e., an amplitude-modulated signal) from the amplitude modulation circuit 4, performs frequency modulation on the received amplitude-modulated signal, and outputs an amplitude-frequency-modulated signal. In more detail, the frequency modulation circuit 5 performs frequency modulation on a video signal to raise its frequency at the positions where the scanning speed has increased, and to lower the frequency at the positions where the scanning speed has slowed. As a result, the frequency modulation circuit 5 outputs an amplitude-frequency-modulated signal 19 with an inverted-U-shaped waveform as shown in FIG. 11. As shown in the figure, the phase of this signal 19 is shifted in the direction of the time axis, and the pulse distribution in each cycle is dense for the center of the screen 10 and sparse for the edges of the screen 10. When the scanning is performed according to this inverted-U-shaped amplitude-frequency-modulated pulse, the nonuniform stripe pattern 15 in FIG. 6 can be corrected to the original form of the uniform stripe pattern 13 in FIG. 4, and therefore distortion in images displayed on the screen 10 can be corrected. When the above frequency modulation has been performed, brightness distribution may slightly change. In this case, it is possible to have the amplitude modulation circuit 4 correct brightness.

Figure 13:
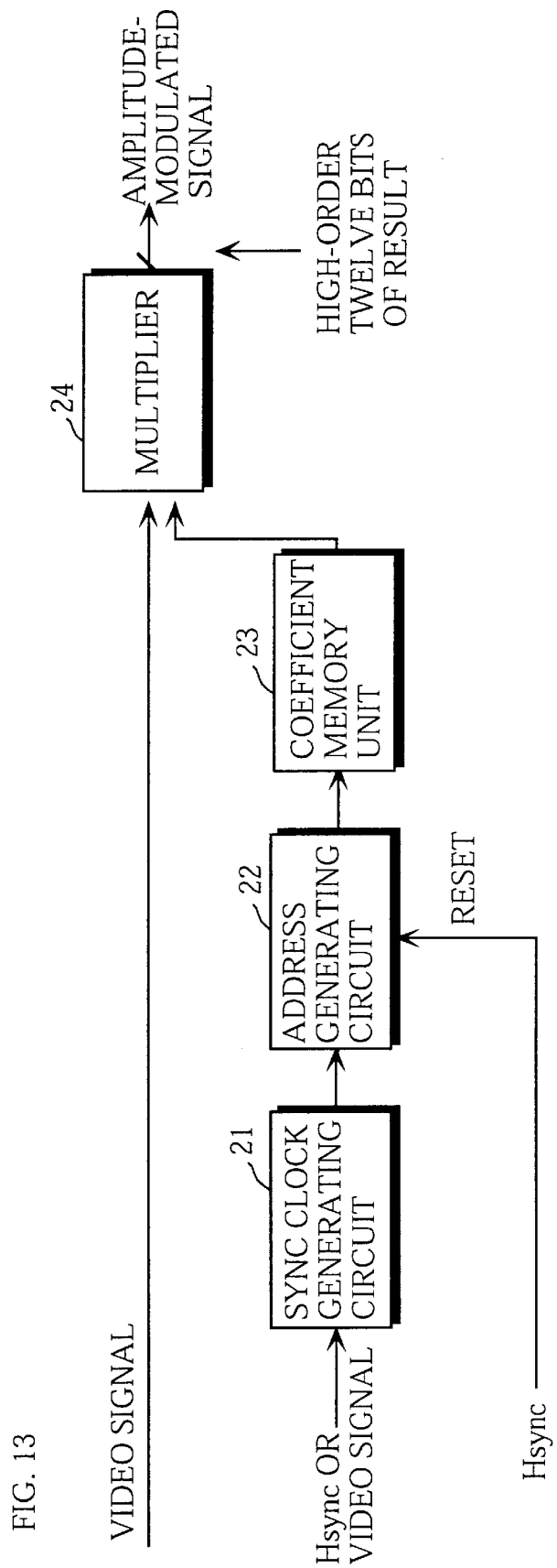
FIG. 13 is an example circuit diagram of an amplitude modulation circuit shown in FIG. 1.

FIG. 13 shows an example construction of the amplitude modulation circuit 4, which includes the following: a synchronous (sync) clock generating circuit 21; an address generating circuit 22; a coefficient memory unit 23; and a multiplier 24. The sync clock generating circuit 21 generates a sync clock that synchronizes with a video signal, and can be achieved by a circuit that multiplies, for instance, a frequency of an Hsync signal by the number of pixels on one scanning line. Note that it is alternatively possible to generate such a sync clock directly from a video signal. The address generating circuit 22 may use, for instance, a counter that counts a sync clock and that is reset by an Hsync signal, and generates an address signal showing an address of the coefficient memory unit 23, from which a coefficient is read in synchronization with a sync clock. For the present embodiment, an address signal is seven-bit data, which shows a value in the range from "0000000" to "1111111", with the former value corresponding to the left edge of the screen 10 and the latter to the right edge of the screen 10. As shown in FIG. 14, the coefficient memory unit 23 stores a plurality of coefficients in ascending order of their values at ascending addresses from a start address to an intermediate address, and coefficients in descending order of their values at ascending addresses from the intermediate address to the ending address. Example coefficients shown in FIG. 14 are each an eight-bit value. As soon as one horizontal scan starts, one eight-bit coefficient is read from the start address of the coefficient memory unit 23, and the last eight-bit coefficient is read from the ending address when the scan ends. This allows the coefficient memory unit 23 to output coefficients in synchronization with a video signal. Each of the outputted eight-bit coefficients is multiplied by a video signal by the multiplier 24. As a result, the multiplier 24 can output an amplitude-modulated signal 17 shown in FIG. 8. When multiplying a twelve-bit video signal and an eight-bit coefficient, the multiplier 24 generates twenty-bit data (twelve bits+eight bits) as the multiplication result. As the twenty bits are excessive, the multiplier 24 outputs high-order twelve bits, containing the most significant bit, of the result.

Figure 15:
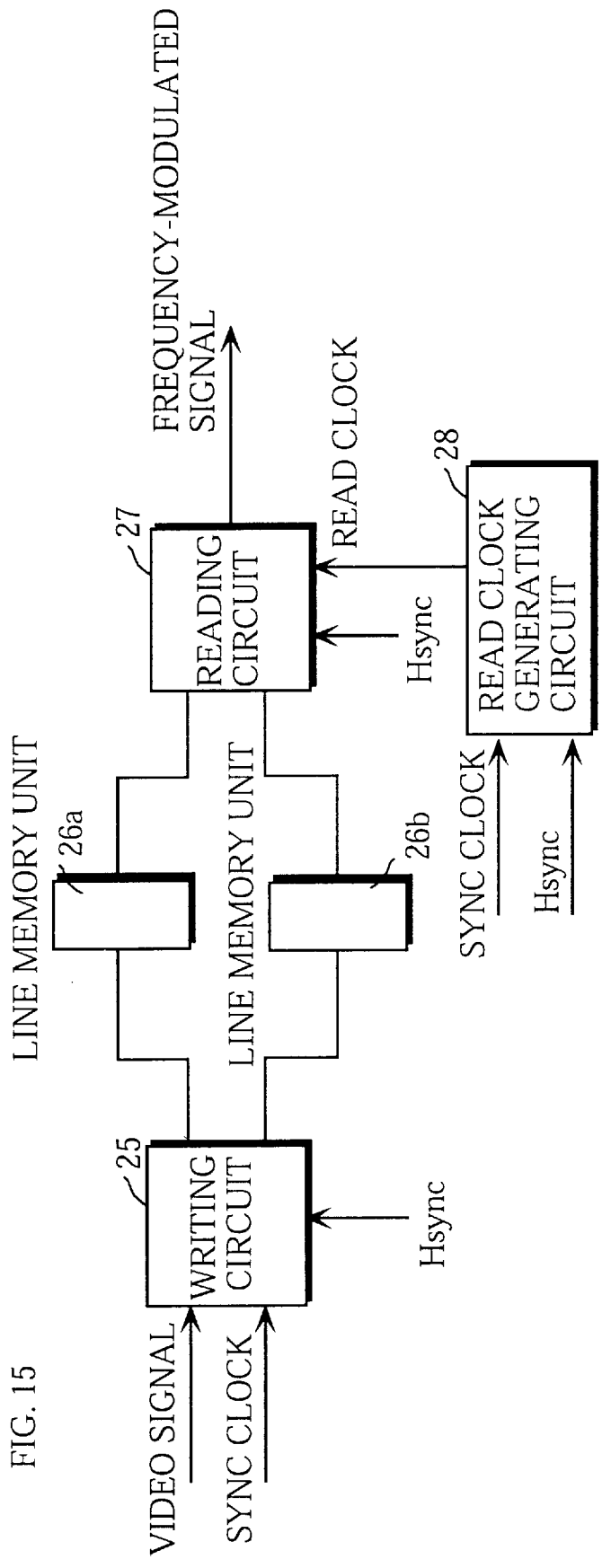
FIG. 15 is an example circuit diagram of a frequency modulation circuit shown in FIG. 1.

FIG. 15 shows an example construction of the frequency modulation circuit 5, which includes the following: a writing circuit 25; line memory units 26a–26b; a reading circuit 27; and a read clock generating circuit 28. The writing circuit 25 is a conventional circuit that contains a signal-writing circuit and a switching circuit. The signal-writing circuit generates a write address of one of the line memories 26a–26b according to a synch clock, and writes a video signal into a specified write address. The switching circuit selects one of the line memory units 26a and 26b into which a video signal should be written in synchronization with an Hsync signal. The line memory units 26a–26b each have a capacity of a video signal corresponding to one scanning line so that video signals for two scanning lines in total can be stored. Therefore, read from and write into the line memory units 26a–26b can be performed in parallel. The reading circuit 27 operates in opposite phase to the writing circuit 25, and contains a switching circuit that selects one of the line memory units 26a–26b in synchronization with an Hsync signal and a signal-reading circuit that reads a video signal from one of the line memory units 26a–26b in synchronization with a read clock. The reading circuit 27 is a conventional circuit also, except that it performs read according to a read clock unique to the present invention. A read clock changes the phase for a sync clock, with one horizontal scan being one cycle. As a result, the reading circuit 26 outputs a frequency-modulated video signal.

Figure 16:
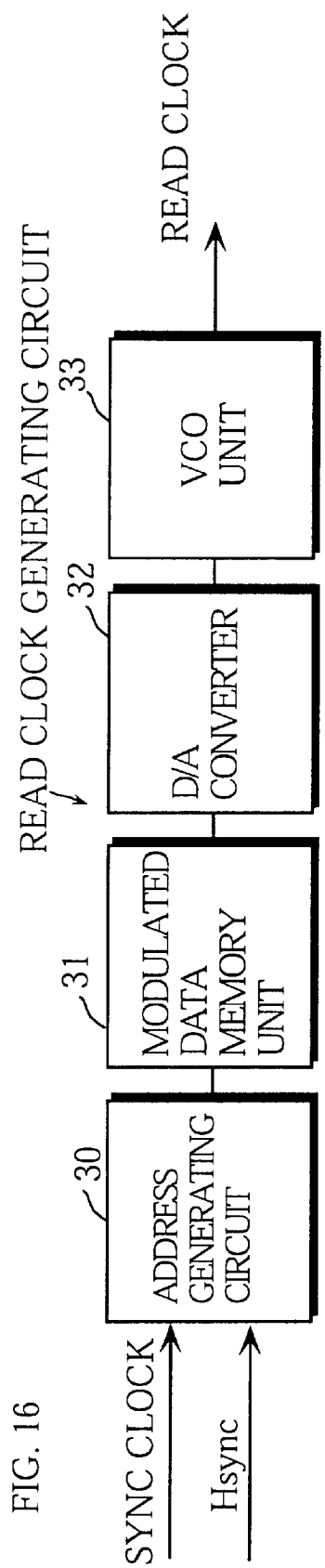
FIG. 16 shows a detailed construction of a read clock generating circuit shown in FIG. 15.
Figures 17, 18:
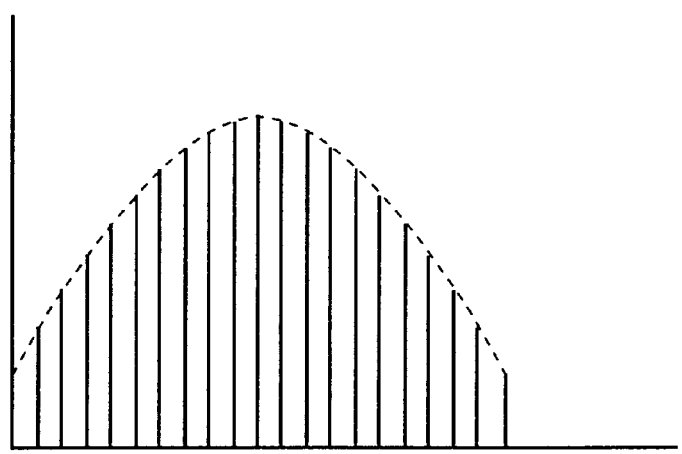
FIG. 17 shows a construction of a modulated data memory unit shown in FIG. 16.
FIG. 18 shows a relationship of addresses and data values corresponding to addresses, both of which are stored in the modulated data memory unit.

Such a read clock is generated by the read clock generating circuit 28, which includes an address generating circuit 30, a modulated data memory unit 31, a digital/analog (D/A) converter 32, and a voltage control originating (VCO) unit 33, as shown in FIG. 16. The address generating circuit 30 is a conventional circuit that generates, in synchronization with each sync clock, address signals that show, for instance, ascending addresses. As shown in FIG. 17, the modulated data memory unit 31 stores sets of data in ascending order of their values at ascending addresses from a start address to an intermediate address, and sets of data in descending order of their values at ascending addresses from the intermediate address to the ending address. FIG. 18 shows a relationship between such addresses and values of sets of data, which are stored in these addresses of the modulated data memory unit 31, with the former being shown on the horizontal axis and the latter on the vertical axis. Each set of data is read from the modulated data memory unit 31 in synchronization with horizontal scanning, and converted by the D/A convertor 32 into analog voltage that has an inverted-U-shaped waveform as shown in FIG. 19C.

The VCO unit 33 is a conventional circuit that outputs a signal having a frequency proportional to an inputted voltage. On receiving analog voltage shown in FIG. 19C, the VCO unit 33 outputs a signal whose frequency changes from low to high and low again as shown in FIG. 19D. This signal is used as read clocks, which are sent to the reading circuit 27. As a result, the reading circuit 27 can read a video signal from one of the line memory units 26a–26b and output it as a frequency-modulated video signal.

As has been described, the CRT system of the present embodiment is capable of providing a uniform resolution for the edges and the center of the screen 10. Moreover, the present CRT system can provide higher resolution without needing to change constructions of its parts, such as an electron gun, into special constructions. In addition, the present CRT system can provide such high and uniform resolution without giving no minus effects on brightness distribution and image distribution on the screen 10.

Note that circuits of the above embodiment operate almost simultaneously although the present embodiment describes the processing of these circuits in order, for ease of explanation. The same result as in the above embodiment can be obtained when the processing orders of the amplitude modulation circuit 4 and the frequency modulation circuit 5 are replaced, or when processing orders of other circuits that, with the exception of the video signal processing circuit, process a video signal are replaced.

The amplitude modulation circuit 4 may be achieved by a circuit or the like that modulates, in synchronization with a horizontal deflection signal, a signal outputted from a gamma correction circuit (not shown in any figure) in the video signal processing circuit 2. The frequency modulation circuit 5 may be included in the video signal processing circuit 2. It is of course possible to perform amplitude modulation and frequency modulation using analog data, instead of digital data as described in the above embodiment.

Second Embodiment

Figure 20:
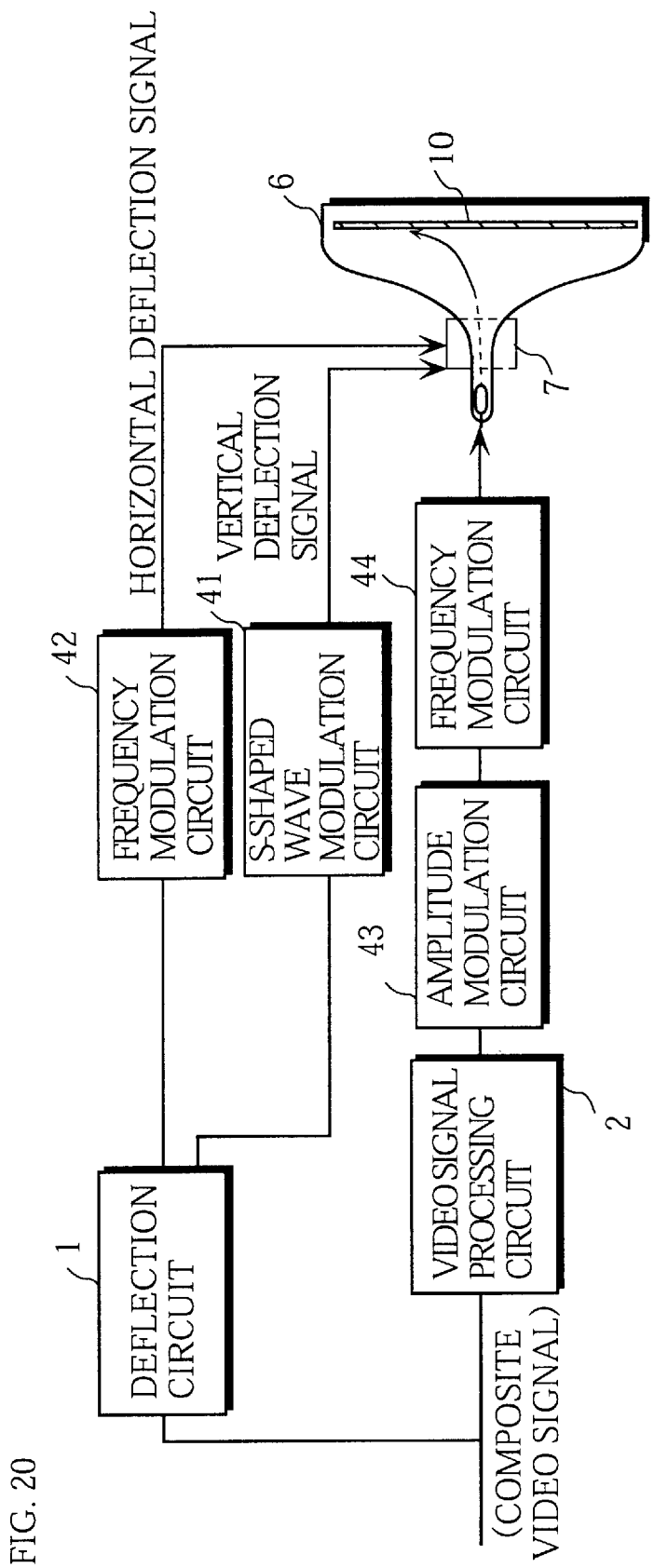
FIG. 20 is a block diagram showing a construction of a CRT system of the second embodiment.

The following describes a CRT system of the second embodiment with reference to drawings from FIG. 20 onward. The present embodiment differs from the first embodiment in that the present embodiment describes a technique to improve resolution at positions near the top and bottom of the screen while the first embodiment describes a technique to improve resolution at positions near the right and left edges of the screen.

FIG. 20 shows a simplified construction of the CRT system of the present embodiment. With this construction, a vertical deflection signal is outputted by a deflection circuit 1, modulated by an S-shaped wave modulation circuit 41 into an S-shaped wave, and sent to a deflection yoke 7. A horizontal deflection signal is frequency-modulated by a frequency modulation circuit 42, and sent to the deflection yoke 7. A video signal is outputted by a video signal processing circuit 2, amplitude-modulated by an amplitude modulation circuit 43, frequency-modulated by a frequency modulation circuit 44, and sent to an electron gun. Like the S-shaped wave modulation circuit 41, the amplitude modulation circuit 43 and the frequency modulation circuits 42 and 44 perform modulation for each cycle which is equal to one vertical scanning period.

Figure 21:
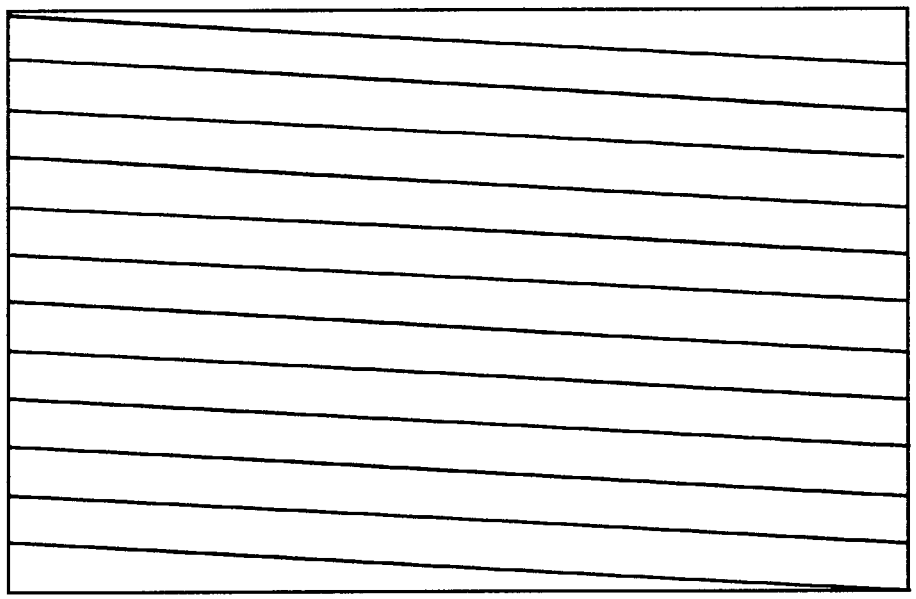
FIG. 21 shows images which are displayed on a screen by a standard CRT system, which performs moderate S-shaped wave modulation on a vertical deflection signal when having received video signals for horizontal stipes spaced at uniform intervals.
Figure 22:
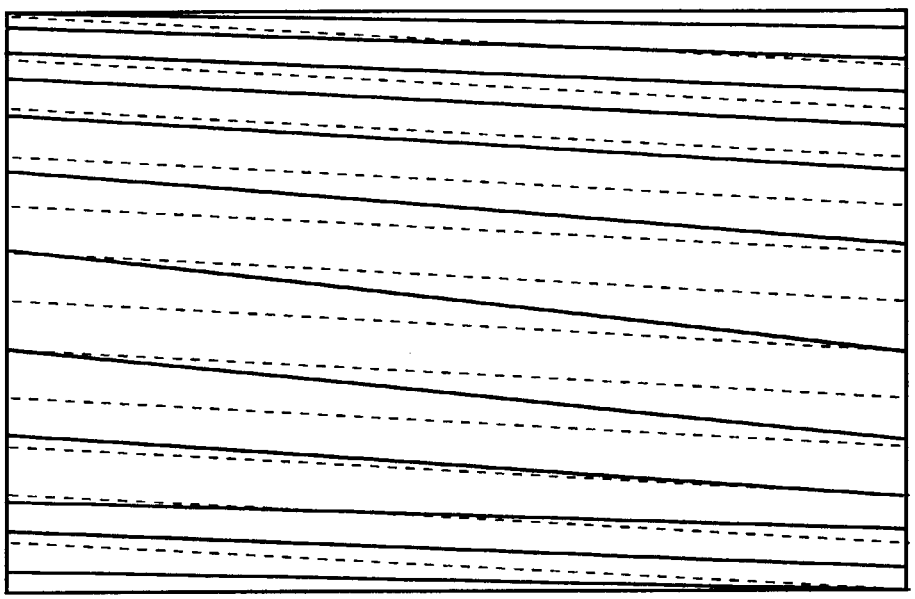
FIG. 22 shows example images which are displayed on a screen by a CRT system, which performs exaggerating S-shaped wave modulation on a vertical deflection signal when having received video signals for horizontal stipes shown in FIG. 21.

When a screen 10 of a CRT 6 is a flat screen, a scanning spot diameter in the vertical direction is larger at positions nearer the top and bottom of the screen 10, as with a spot diameter in the horizontal direction becoming larger nearer the right and left edges of the screen 10. This is called spot distortion. The spot distortion at positions near the top and bottom of the screen 10 can be corrected by performing S-shaped waveform modulation on a vertical deflection signal. For the present embodiment, exaggerated S-shaped wave modulation is performed on a vertical deflection signal so that stripes shown by solid lines in FIG. 22 are displayed, instead of horizontal stripes as shown in FIG. 21, which are displayed when normal S-shaped wave modulation is performed and are spaced at uniform intervals (strictly speaking, these horizontal stripes have slightly downward inclination to the right, which has been emphasized in FIG. 21). As shown in FIG. 22, the exaggerated S-shaped wave modulation for the present embodiment results in stripes whose intervals are narrower nearer the top and bottom of the screen 10 and wider nearer the center of the screen 10.

Figure 23A:
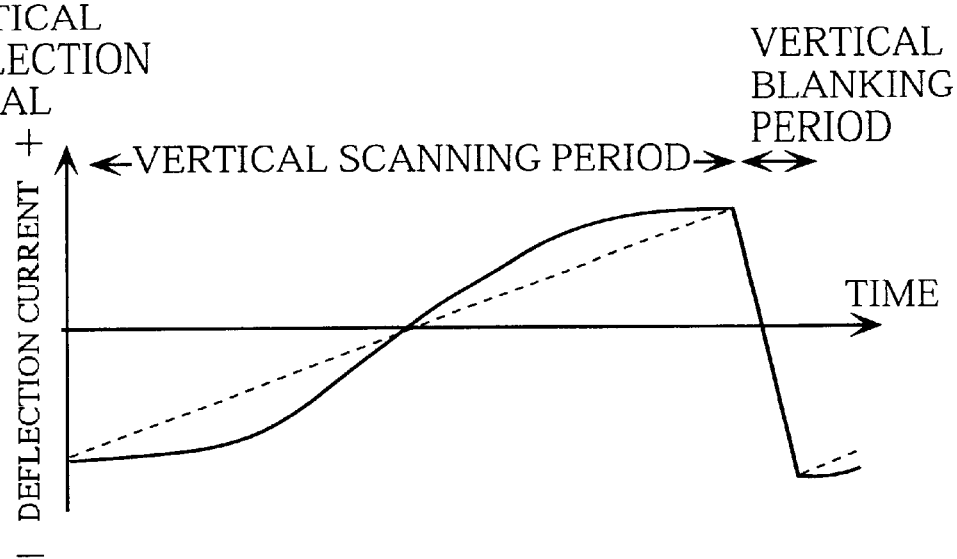
FIG. 23A shows a waveform of a vertical deflection signal on which S-shaped wave modulation has been performed.

FIG. 23A shows the waveform of a vertical deflection signal on which the above S-shaped wave modulation has been performed. As a result of this modulation, the vertical scanning speed becomes higher at positions nearer the center of the screen 10 and lower nearer the top and bottom of the screen 10. Consequently, brightness becomes higher at positions nearer the top and bottom of the screen 10 and lower nearer the center of the screen 10. The difference in the vertical scanning speed also makes horizontal scanning lines unparallel, as shown by stripes represented by solid lines in FIG. 22, in which stripes displayed nearer the center of the screen 10 have a steeper inclination than stripes nearer the bottom and top.

Figure 24A:
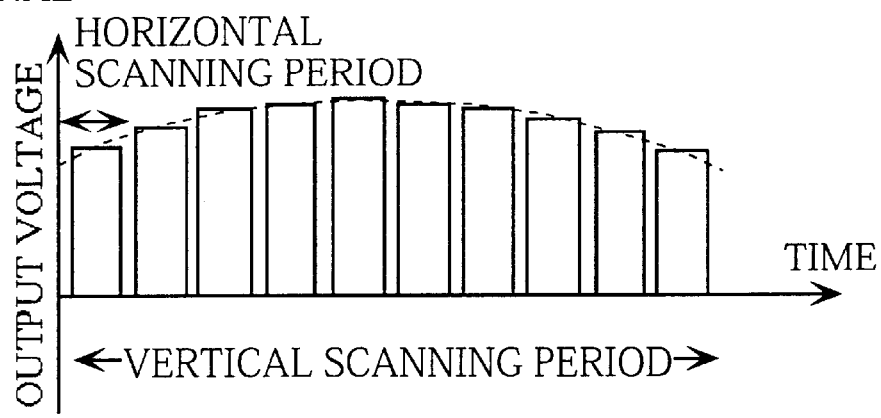
FIG. 24A shows video signals which have been amplitude-modulated in synchronization with a vertical deflection signal.

Differences in brightness between the center and the top/bottom of the screen 10 can be eliminated by having the amplitude modulation circuit 43 perform amplitude modulation on a video signal in synchronization with a vertical deflection signal in the manner shown in FIG. 24A. This also enhances resolution at positions near the top and bottom of the screen 10 due to the relationship between a beam current and a static spot diameter in the vertical direction. This relationship is similar to that between a beam current and a static spot diameter in the horizontal direction shown in FIG. 10.

Figure 23B:
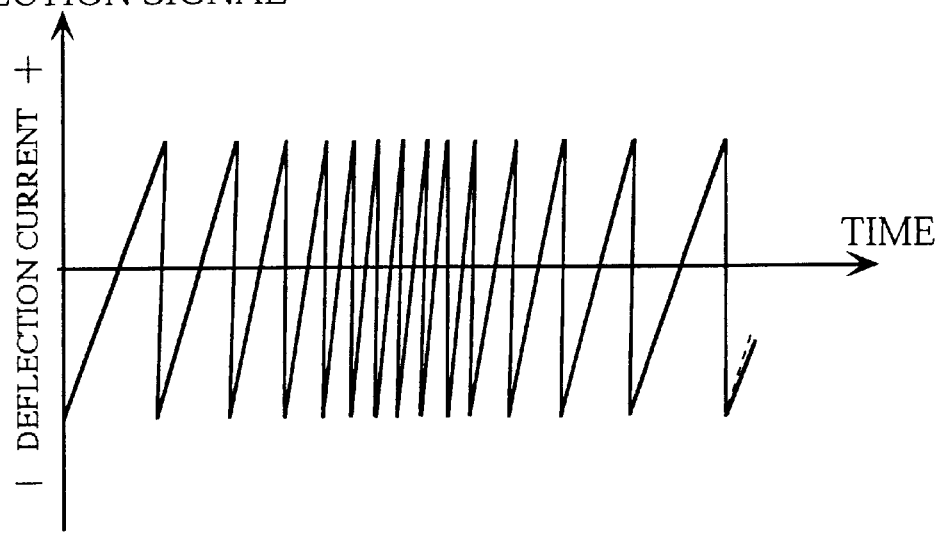
FIG. 23B shows a waveform of a horizontal deflection signal which has been frequency-modulated in vertical scanning cycles.
Figure 24B:
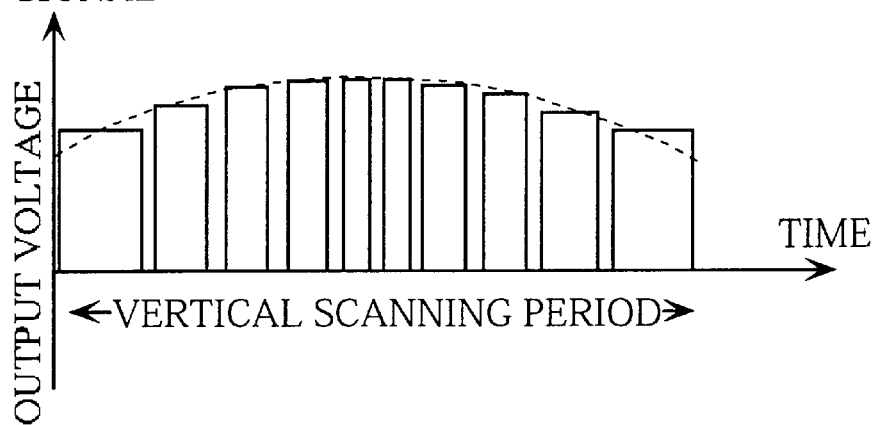
FIG. 24B shows the video signals obtained by performing frequency modulation on the amplitude-modulated video signals shown in FIG. 24A in synchronization with a vertical deflection signal.

With the vertical deflection signal and the video signal being modulated in this way, the frequency modulation circuits 42 and 44 perform frequency modulation on the horizontal deflection signal and the video signal, respectively, for each vertical scan. FIGS. 23B and 24B show a horizontal deflection signal and a video signal which have been frequency-modulated.

For an waveform of the frequency-modulated horizontal deflection signal shown in FIG. 23B, inclination becomes less steep at positions nearer the top and bottom of the screen 10 and steeper nearer the center, which means that the horizontal scanning speed is higher at positions nearer the center of the screen 10. Consequently, inclination of the horizontal scanning lines becomes uniform, and the scanning lines become parallel at uniform intervals, as shown by dotted lines in FIG. 22.

On the other hand, the frequency modulation circuit 44 performs frequency modulation on the video signal and outputs the video signal in accordance with a duration of each horizontal scan. As a result, image distortion can be corrected.

Accordingly, with the CRT system of the present embodiment, resolution can be increased near the top and bottom of the screen 10.

Resolution near the right and left edges of the screen 10 can be improved by including the S-shaped wave modulation circuit 3 of the first embodiment into the present CRT system, and by adjusting the amplitude modulation circuit 43 and the frequency modulation circuit 44. This adjustment can be made by enabling the amplitude modulation circuit 43 and the frequency modulation circuit 44 to perform amplitude/frequency modulations in accordance with each vertical scanning cycle, and modulations in accordance with each horizontal scanning cycle within the vertical scanning cycle. This is to say, the amplitude modulation circuit 43 and the frequency modulation circuit 44 are adjusted to perform a composite modulation combining a modulation whose one cycle is one vertical scanning period and a modulation whose one cycle is one horizontal scanning period.

The present CRT system to which the above modifications are made is capable of reducing a diameter of a static spot near not only the right and left edges of the screen 10 but also the top and bottom of the screen 10. Accordingly, fine resolution can be obtained even in corners of the screen where the beam spot is likely to be distorted. Note that the S-shaped wave modulation circuit 3 should be included in the present CRT system preferably in a manner that has the processing of this circuit 3 precede that of the frequency modulation circuit 42.

Detailed constructions of the amplitude modulation circuit 43 and the frequency modulation circuits 42 and 44 are not described in the present embodiment, and these circuits 42-44 have basically the same constructions as those of the first embodiment, except that the circuits 42-44 of the present embodiment use the Vsync signal, instead of the Hsync signal, as a trigger signal.

Third Embodiment

The following describes the third embodiment of the present invention.

A CRT system of the present embodiment can be achieved by applying the constructions of the CRT systems of the first and second embodiments to a CRT system that performs reciprocating scanning. Reciprocating scanning is a conventional technique, and therefore circuitry for the reciprocating scanning will not be described.

Figure 12:
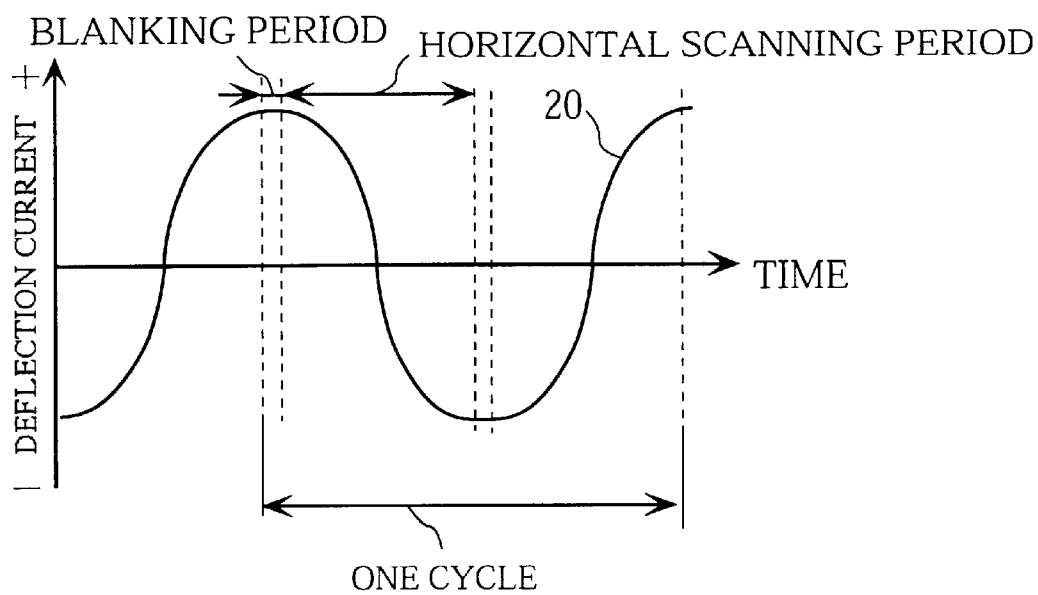
FIG. 12 shows a waveform of a horizontal deflection signal outputted by a CRT circuit according to another embodiment.

As a result of the S-shaped waveform modulation being performed, a horizontal deflection signal has a waveform 20 shown in FIG. 12, in which uniform waves symmetric with respect to the time axis repeatedly appear.

As can be understood from FIG. 12, each cycle corresponds to two scanning lines so that a horizontal deflection signal frequency for the present embodiment can be reduced to half a horizontal deflection signal frequency used by a standard scanning. This also results in reducing a deflection power to half. In addition, when reciprocating scanning is performed according to the S-shaped modulated horizontal signal, wave shaping becomes easier than when the scanning is performed according to a signal with a standard sawtooth waveform, which is sharper than the S-shape for the present embodiment. The wave shaping becomes even easier if a horizontal deflection signal of the present embodiment is approximated by a sine function.

The above embodiments use a CRT that scans a screen with an electron beam in the horizontal direction to describe the present invention although the present invention can be also used for a CRT that scans a screen in the vertical direction.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A CRT (cathode-ray tube) system of a raster scan type that displays images on
    a screen by deflecting an electron beam, which has been modulated using a video signal, to consecutively scan the screen in a main scanning direction while scanning in a sub-scanning direction that is perpendicular to the main scanning direction, the CRT system comprising:
    speed modulating means for modifying a deflection speed by modulating a deflection signal that is used to deflect the electron beam in either the sub-scanning direction or the main scanning direction, the deflection speed being a speed at which the electron beam traverses the screen in either the sub-scanning direction or the main scanning direction;
    amplitude modulating means for performing modulation by increasing the amplitude of a video signal corresponding to a center of the screen in the main scanning direction, and decreasing the amplitude of a video signal corresponding to edges of the screen in the main scanning direction; and
    frequency modulating means for performing frequency modulation on the deflection signal and/or the video signal either before or after the amplitude modulation.

2. The CRT system of claim 1,
    wherein the sub-scanning direction is a vertical direction of the screen and the main scanning direction is a horizontal direction of the screen,
    wherein the speed modulating means modifies the deflection speed to high at positions near a center of the screen and low at positions near edges of the screen, the deflection speed being a horizontal deflection speed at which the electron beam traverses the screen in the horizontal direction, and
    wherein the amplitude modulating means and the frequency modulating means perform the amplitude modulation and the frequency modulation, respectively, on the video signal in synchronization with a horizontal scan cycle during which the electron beam makes one complete traverse of the screen in the horizontal direction.

3. The CRT system of claim 2,
    wherein the amplitude modulating means performs the amplitude modulation on the video signal to raise an amplitude of the video signal at the positions where the horizontal deflection speed is made high, and to lower the amplitude of the video signal at the positions where the horizontal deflection speed is made low, and
    wherein the frequency modulating means performs the frequency modulation on the video signal to raise a frequency of the video signal at the positions where the horizontal deflection speed is made high, and to lower the frequency of the video signal at the positions where the horizontal deflection speed is made low.

4. The CRT system of claim 3,
    wherein the deflection signal is a horizontal deflection signal,
    wherein the speed modulating means is a circuit that performs S-shaping modulation on the horizontal deflection signal to shape a wave of the horizontal deflection signal into an S-shape, and
    wherein the S-shaping modulation overcorrects the horizontal deflection speed to counteract differences in the horizontal deflection speed resulting from differences in deflection sensitivity between: (a) right and left edges of the screen; and (b) a center part of the screen.

5. The CRT system of claim 3, wherein a horizontal scan is performed in a reciprocating manner in which scanning directions on adjacent horizontal scanning lines are opposite.

6. The CRT system of claim 1,
    wherein the sub-scanning direction is a vertical direction of the screen and the main scanning direction is a horizontal direction of the screen,
    wherein the speed modulating means modifies the deflection speed to high at positions near a center of the screen and low at positions near edges of the screen, the deflection speed being a vertical deflection speed at which the electron beam traverses the screen in the vertical direction, wherein the amplitude modulating means performs the amplitude modulation on the video signal in synchronization with a vertical scan cycle in which the electron beam makes one complete traverse of the screen in the vertical direction, and wherein the frequency modulating means performs the frequency modulation on the video signal and a deflection signal that is a horizontal deflection signal in synchronization with the vertical scan cycle.

7. The CRT system of claim 6, wherein the amplitude modulating means performs the amplitude modulation on the video signal to raise an amplitude of the video signal at the positions where the vertical deflection speed is made high, and to lower the amplitude of the video signal at the positions where the vertical deflection speed is made low, and wherein the frequency modulating means performs the frequency modulation on the video signal and the horizontal deflection signal to raise frequencies of the horizontal deflection signal and the video signal at the positions where the vertical deflection speed is made high, and to lower the frequencies of the video signal and the horizontal deflection signal at the positions where the vertical deflection speed is made low.

8. The CRT system of claim 7, wherein the speed modulating means is a circuit that performs S-shaping modulation on the deflection signal to shape a waveform of the deflection signal into an S-shape, the deflection signal being a vertical deflection signal, and wherein the S-shaping modulation overcorrects the vertical deflection speed to counteract differences in the vertical deflection speed resulting from differences in deflection sensitivity between: (a) top and bottom parts of the screen; and (b) a central part of the screen.

9. The CRT system of claim 7, wherein a horizontal scan is performed in a reciprocating manner in which scanning directions on adjacent horizontal scanning lines are opposite.

10. A CRT system of a raster scan type that displays images on a screen by deflecting an electron beam, which has been modulated using a video signal, to consecutively scan the screen in a main scanning direction while scanning in a sub-scanning direction that is perpendicular to the main scanning direction, the CRT system comprising:

first speed modulating means for modifying a first deflection speed by modulating a first deflection signal in first cycles equal to a period during which the electron beam makes one complete traverse of the screen in the sub-scanning direction, the first deflection signal being used to deflect the electron beam in the sub-scanning direction, the first deflection speed being a speed at which the electron beam traverses the screen in the sub-scanning direction;

first amplitude modulating means for performing first amplitude modulation on the video signal in the first cycles;

first frequency modulating means for performing, in synchronization with the first amplitude modulation, first frequency modulation on: (a) the video signal; and (b) a second deflection signal that is used to deflect the electron beam in the main scanning direction, the first frequency modulation being performed either before or after the first amplitude modulation;

second speed modulating means for modifying a second deflection speed by modulating the second deflection signal in second cycles equal to a period during which the electron beam makes one complete traverse of the screen in the main scanning direction, the second deflection speed being a speed at which the electron beam traverses the screen in the main scanning direction; and second amplitude modulating means for performing second amplitude modulation on the video signal in the second cycles; and second frequency modulating means for performing, in synchronization with the second amplitude modulation, the second frequency modulation on the video signal, the second frequency modulation being performed either before or after the second amplitude modulation.

11. The CRT system of claim 10, wherein the sub-scanning direction is a vertical direction of the screen and the main scanning direction is a horizontal direction of the screen, wherein the first speed modulating means modifies the first deflection speed to high at positions near a center of the screen and low at positions near edges of the screen, the first deflection speed being a vertical deflection speed at which the electron beam traverses the screen in the vertical direction, wherein the first amplitude modulating means performs the first amplitude modulation to raise an amplitude of the video signal at the positions where the vertical deflection speed is made high, and to lower the amplitude of the video signal at the positions where the vertical deflection speed is made low, wherein the first frequency modulating means performs the first frequency modulation to raise frequencies of the second deflection signal and the video signal at the positions where the vertical deflection speed is made high, and to lower the frequencies of the second deflection signal and the video signal at the positions where the vertical deflection speed is made low, wherein the second speed modulating means modifies the second deflection speed to high at positions near a center of the screen and low at positions near edges of the screen, the second deflection speed being a horizontal deflection speed at which the electron beam traverses the screen in the horizontal direction, wherein the second amplitude modulating means performs the second amplitude modulation to raise an amplitude of the video signal at the positions where the horizontal deflection speed is made high, and to lower the amplitude of the video signal at the positions where the horizontal deflection speed is made low, and wherein the second frequency modulating means performs the second frequency modulation to raise a frequency of the video signal at the positions where the horizontal deflection speed is made high, and to lower the frequency of the video signal at the positions where the horizontal deflection speed is made low.

12. The CRT system of claim 11, wherein the first speed modulating means is a circuit that performs S-shaping modulation on the first deflection signal to shape a waveform of the first deflection signal into an S-shape, the first deflection signal being a vertical deflection signal, and wherein the first S-shaping modulation changes the vertical deflection speed to a higher extent than is required to counteract differences in the vertical deflection speed that are present at different positions of the screen, the differences resulting from differences in deflection sensitivity between: (a) top and bottom parts of the screen; and (b) a central part of the screen, herein the second speed modulating means is a circuit that performs S-shaping modulation on the second. deflection signal to shape a wave of the second deflection signal into an S-shape, the second deflection signal being a horizontal deflection signal, and wherein the S-shaping modulation changes the horizontal deflection speed to a higher extent than is required to counteract differences in the horizontal deflection speed that are present at different positions of the screen, the differences resulting from differences in deflection sensitivity between: (a) right and left edges of the screen; and (b) a central part of the screen.

13. The CRT system of claim 11, wherein a horizontal scan is performed in a reciprocating manner in which scanning directions on adjacent horizontal scanning lines are opposite.

14. A CRT (cathode-ray tube) system of a raster scan type that displays images on a screen by deflecting an electron beam, which has been modulated using a video signal, to consecutively scan the screen in a main scanning direction while scanning in a sub-scanning direction that is perpendicular to the main scanning direction, the CRT system comprising:

an electron gun, which projects an electron beam in the direction of the screen, main/sub-scanning unit for deflecting the electron beam projected from the electron gun in the main scanning direction and the sub-scanning direction, and amplitude modulating unit for performing modulation by increasing the amplitude of a video signal corresponding to a center of the screen in the main scanning direction, and decreasing the amplitude of a video signal corresponding to edges of the screen in the main scanning direction, the video signals being sent to the electron gun.

15. The CRT system of claim 14, further comprising:

speed modulating unit for modulating a deflection signal to deflect an electron beam in order to scan faster near the center of the screen in the main scanning direction, and slower at the edges of the screen in the main scanning direction.

16. The CRT system of claim 15, further comprising:

frequency modulating unit for raising a frequency of a video signal corresponding to an area where scanning is faster, and lowering a frequency of a video signal corresponding to an area where scanning is slower.

17. The CRT system of claim 16, wherein the S-shaping modulation overcorrects the main scanning direction deflection speed in order to counteract differences in the main scanning direction deflection speed which result from differences in deflection sensitivity between: (a) right and left edges of the screen, and (b) a center part of the screen.

18. The CRT system of claim 16, wherein scanning in the main scanning direction is performed in a reciprocating manner, such that adjacent scan lines are scanned in opposite directions.

19. A CRT (cathode-ray tube) system of a raster scan type that displays images on a screen by deflecting an electron beam, which has been modulated using a video signal, to consecutively scan the screen in a main scanning direction while scanning in a sub-scanning direction that is perpendicular to the main scanning direction, the CRT system comprising:

amplitude modulating unit for performing modulation by increasing the amplitude of a video signal corresponding to a center of the screen in the sub-scanning direction, and decreasing the amplitude of a video signal corresponding to edges of the screen in the sub-scanning direction.

20. The CRT system of claim 19, further comprising:

speed modulating unit for modulating a first deflection signal to deflect an electron beam in the sub-scanning direction in order to scan faster near the center of the screen in the sub-scanning direction, and slower at the edges of the screen in the sub-scanning direction.

21. The CRT system of claim 20, further comprising:

frequency modulating unit for modulating a frequency of a video signal and a second deflection signal, which deflects the electron beam to scan in the main scanning direction, and, when deflecting an electron beam in the sub-scanning direction, for raising a frequency of the second deflection signal and a video signal corresponding to an area where scanning is faster, and lowering a frequency of a second deflection signal and a video signal corresponding to an area where scanning is slower.

22. The CRT system of claim 21, wherein scanning in the main direction is performed in a reciprocating manner, such that adjacent scan lines are scanned in opposite directions.

* * * * *